United States Patent Office 3,379,470
Patented Apr. 23, 1968

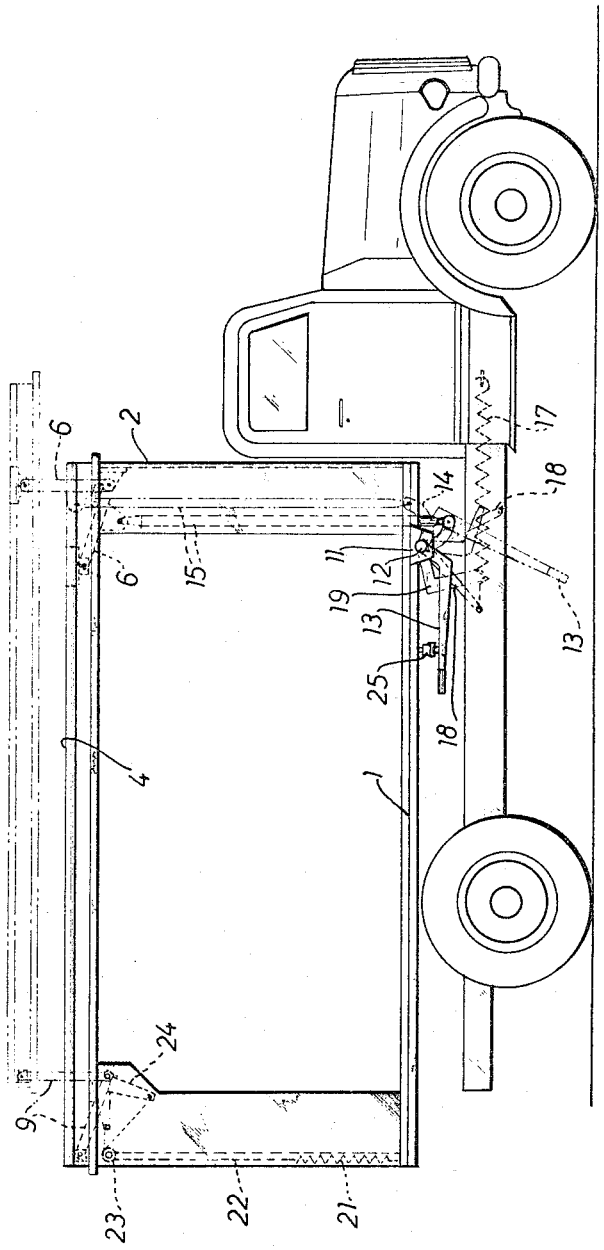

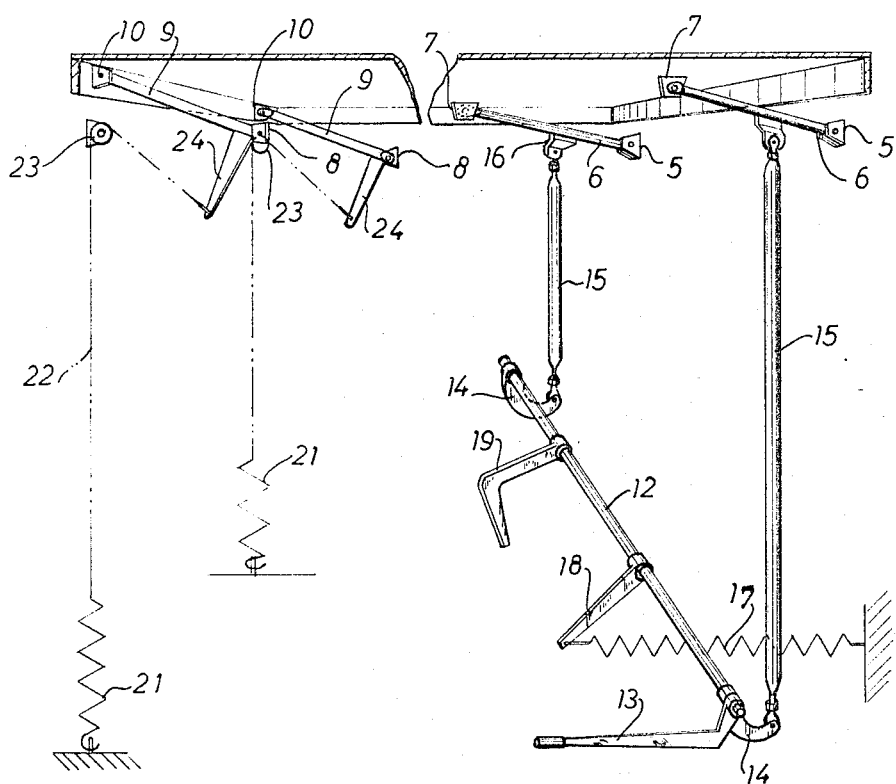

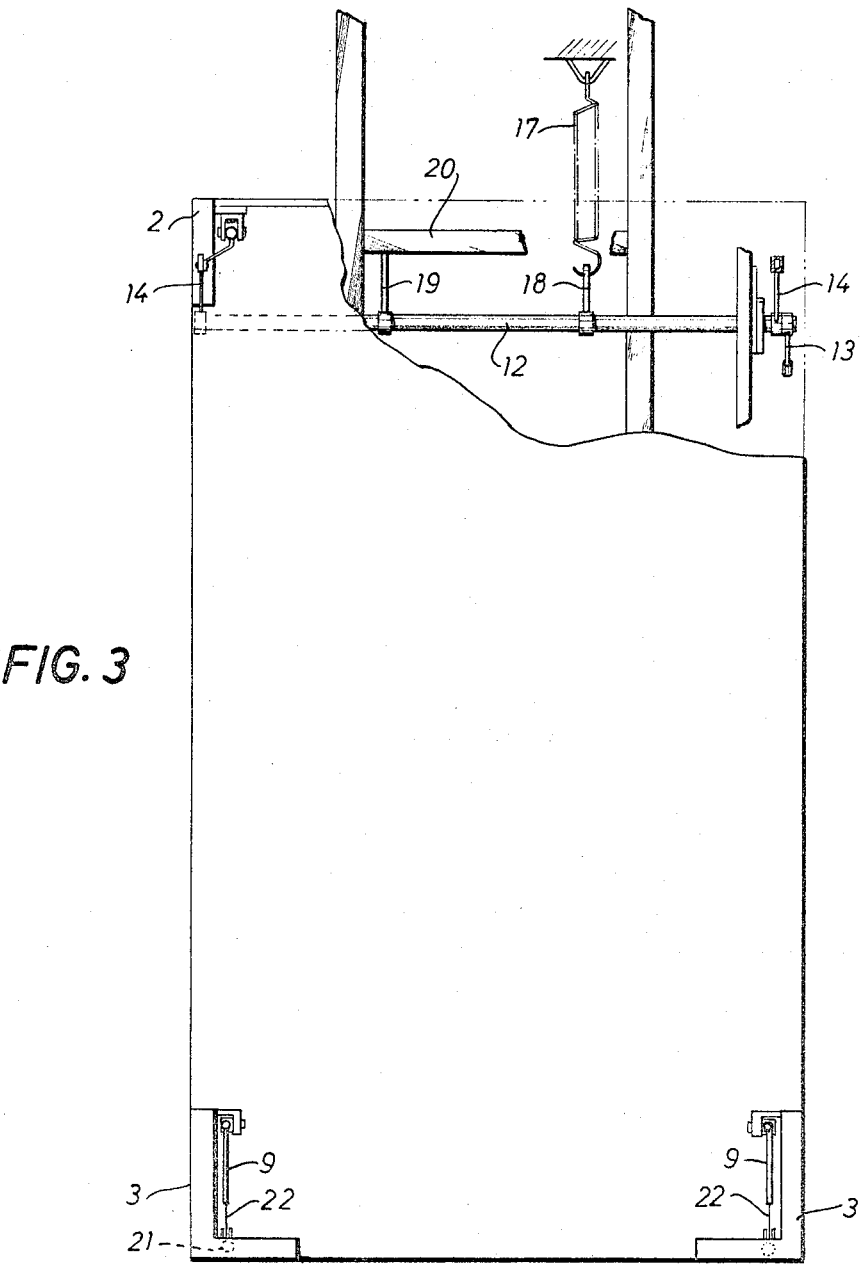

3,379,470
SUPERSTRUCTURES FOR LOAD VEHICLES
Lars Börje Svante Herou, 24 Slatvarsgatan,
Vastra Frolunda, Sweden
Filed July 26, 1966, Ser. No. 567,891
3 Claims. (Cl. 296—137)

ABSTRACT OF THE DISCLOSURE

The present vehicle includes a storage compartment having a roof which can be vertically raised and lowered as desired and for this purpose includes a lever controlled shaft rotatably mounted beneath the storage compartment platform for operating links extending upwardly above said platform for pivoting arms pivotally mounted at one end on a superstructure mounted on said platform and which arms are pivotally connected to an end portion of said roof. Spring control means assist in raising said roof through connection to said shaft and also to further arms pivotally connected to said roof and superstructure at the opposite end of the superstructure.

Description

The present invention relates to vehicles having a load carrying platform provided with a roof-covered superstructure.

In vehicles of this type the height of the superstructure is restricted in view of the height of gates and the like through which the vehicle must be able to pass. As a rule, it is therefore not possible to make the superstructure high enough to allow a person to stand upright on the platform when loading and unloading.

This inconvenience is overcome by the present invention. According to the invention there is connected, adjacent each of the corners of the roof, one end of an arm the opposite end of which is pivoted on the upper part of the superstructure, and means are provided for swinging said arms from a position in which the roof rests against the superstructure to a position in which the roof is raised from the superstructure. This arrangement makes it possible to raise the roof during the loading and unloading to provide sufficient space whereby the loading and unloading is facilitated and can be effected more rapidly.

According to one embodiment of the invention two links are connected at their upper ends one to each of those of said arms which are disposed at one end of the superstructure, said links being connected at their lower ends each to one of two further arms which are secured to a common shaft journalled below the load platform and extending transversely thereof, an operating lever being connected to said shaft for rotating the same in order to cause the arms connected to the roof to be swung upwardly through the intermediary of said links for raising the roof.

In order to provide an auxiliary force for raising the roof there may be provided a draw spring which has one end secured in the vehicle and which has its other end connected to an arm projecting from said shaft in such a manner, that the spring is tensioned when the roof is in the lowered position.

Each of those of the arms connected with the roof which are disposed at the end of the superstructure opposite to said shaft may be provided with an angle arm connected to a draw spring which is tensioned in the lowered position of the roof for providing an auxiliary force for raising the roof.

The invention will be more closely described here below with reference to the accompanying drawings, wherein:

FIGURE 1 is a side view of a lorry provided with a superstructure according to the invention;
FIGURE 2 is a perspective view of the roof and the means for raising and lowering the roof, and
FIGURE 3 is a partly broken view from above of the loading platform with the roof of the superstructure removed.

In the drawings, numeral 1 indicates the load platform which is provided at the four corners with angular corner posts of a box-type construction, the corner posts at the front end of the platform being indicated at 2 and the rear corner posts being indicated at 3. The corner posts support a roof 4 and are further arranged in a manner known per se to support rolling shutters for closing the sides of the superstructure. For the sake of clarity such shutters are not shown in the drawings. Each of the front corner posts 2 is provided at the upper end with an attachment 5 to which is pivotally connected one end of an arm 6 which has its opposite end pivotally connected to an attachment 7 provided at the inner side of the roof at a distance from the front edge thereof. In a corresponding manner two arms 9 are pivotally connected at one end to attachments 8 at the upper end of each of the rear corner posts 3 and have their opposite ends pivotally conected to attachments 10 provided adjacent the rear edge of the roof. Adjacent the front edge of the platform 1 there is provided, at the under side of the platform, a transverse shaft 12 which is rotatably journalled in bearings 11 and which is rotatable by means of an operating lever 13 secured to the shaft adjacent one end thereof. Two arcuate arms 14 are connected to the shaft one adjacent each end thereof. Each arm 14 has its opposite end connected to the lower end of a link 15 which extends vertically through the adjacent corner post 2 and which is articulated at its upper end to an attachment plate 16 connected to the adjacent arm 6 between the ends thereof. By rotating the shaft 12 in a counterclockwise direction from the position shown in FIGURES 1 and 2 the arms 6 will thus be swung upwardly through the intermediary of the arms 14 and the links 15 to the position indicated in broken lines in FIGURE 1, thereby raising the roof 4 from the position shown in full lines to the position indicated in broken lines in which the roof is raised from the superstructure and slightly displaced forwardly relative thereto.

A draw spring 17 has one end connected to the chassis of the lorry in front of the load platform and the other end of the spring is connected to the free end of an arm 18 secured to the shaft 12 and projecting therefrom in such a direction, that the spring 17 will be tensioned in the lowered position of the roof and will thereby deliver an auxiliary force for raising the roof by means of the operating lever 13. For the purpose of limiting the angular rotation of the shaft 12, an angular arm 19 is secured to the shaft and adapted to cooperate with an abutment on the chassis of the lorry, such abutment being for instance in the form of a transverse beam as indicated at 20 in FIGURE 3. In the embodiment shown in the drawings there are also provided auxiliary springs for the rear pair 9 of the lifting arms of the roof. These auxiliary springs are comprised of two draw springs 21 provided vertically one in each of the rear corner posts 3 and having their lower ends secured to the platform, a wire 22 being connected to the upper end of each spring and extending over a pulley 23 journalled at the upper end of the corner post, said wires being connected each to one of two angle arms 24 extending from the arms 9. Thanks to the provision of the auxiliary springs 17 and 21 a very slight force is needed for raising and lowering the roof by means of the operating lever 13. For securing the roof in the lowered position a locking device of any suitable kind may be used. In the embodiment shown a hook and shackle device 25 is provided for securing the operating lever in the position in which the roof is lowered (see FIG. 1).

The invention is not limited to the embodiment described hereabove and shown in the drawings as an example only, said embodiment being susceptible of various modifications with respect to its details without departing from the basic concept of the invention.

What I claim is:

1. In a vehicle, having a load carrying compartment and a movable roof for said compartment, means for raising and lowering the roof comprising a roof, a load carrying platform mounted on the vehicle, a superstructure including hollow portions mounted on and extending above said platform and detachably supporting the roof thereon, a plurality of arms each pivotally connected at one end to said superstructure and at its other end to the roof, a plurality of links positioned within said hollow portions and each being pivotally connected at one end to one of said arms adjacent one end of said superstructure, a shaft rotatably mounted below said platform transversely thereof, an operating lever fixedly connected to said shaft for rotating the same, and a plurality of arms fixedly connected to said shaft and each pivotally connected to the other end of one of said links adjacent said one end of said superstructure whereby rotation of said shaft can raise and lower said roof relative to said superstructure.

2. In a vehicle having a load carrying compartment, a movable roof for said compartment as claimed in claim 1 wherein a further arm is fixedly attached at one end to and extends from said shaft, a spring is attached to said further arm and to the vehicle and said spring tends to rotate said shaft through said further arm in a direction for assisting in raising said roof.

3. In a vehicle having a load carrying compartment, a moveable roof for said compartment as claimed in claim 1 including a plurality of angle arms each attached to and extending from one of said first mentioned arms adjacent the other end of said superstructure, a plurality of draw springs attached to said vehicle and each connected to one of said angle arms tending to raise said roof.

References Cited

UNITED STATES PATENTS

| | | | |
|---|---|---|---|
| 2,568,822 | 9/1951 | Pervis | 280—43.13 X |
| 2,624,590 | 1/1953 | Tilton | 280—43.14 |
| 2,812,189 | 11/1957 | Geldhof | 280—43.14 |
| 3,292,351 | 12/1966 | Larson et al. | 280—43.13 X |

FOREIGN PATENTS

| | | |
|---|---|---|
| 677,489 | 3/1930 | France. |
| 316,810 | 9/1928 | Great Britain. |

BENJAMIN HERSH, *Primary Examiner.*

C. C. PARSONS, R. SONG, *Assistant Examiners.*